(12) United States Patent
Shima et al.

(10) Patent No.: US 8,212,878 B2
(45) Date of Patent: Jul. 3, 2012

(54) CALIBRATION APPARATUS OF ON-VEHICLE CAMERA, PROGRAM, AND CAR NAVIGATION SYSTEM

(75) Inventors: Takeshi Shima, Tokyo (JP); Shoji Muramatsu, Ibaraki (JP); Yuji Otsuka, Ibaraki (JP); Tatsuhiko Monji, Ibaraki (JP); Kota Irie, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 1314 days.

(21) Appl. No.: 11/769,986

(22) Filed: Jun. 28, 2007

(65) Prior Publication Data

US 2008/0007619 A1 Jan. 10, 2008

(30) Foreign Application Priority Data

Jun. 29, 2006 (JP) .................................. 2006-179540

(51) Int. Cl.
*H04N 5/225* (2006.01)

(52) U.S. Cl. .................. 348/207.99; 348/113; 348/116; 348/118; 348/208.14; 340/901; 340/905; 382/100; 382/104; 382/106; 382/107

(58) Field of Classification Search .................. 348/113, 348/116, 118, 119, 207.99, 208.14; 340/901, 340/905; 382/100, 104, 106, 107
See application file for complete search history.

(56) References Cited

U.S. PATENT DOCUMENTS

| 5,220,508 | A | | 6/1993 | Ninomiya et al. |
| 5,638,116 | A | | 6/1997 | Shimoura et al. |
| 5,739,848 | A | * | 4/1998 | Shimoura et al. ............. 348/119 |
| 5,890,083 | A | * | 3/1999 | Franke et al. .................... 701/45 |
| 5,938,710 | A | * | 8/1999 | Lanza et al. ..................... 701/50 |
| 6,552,742 | B1 | * | 4/2003 | Seta ................................. 348/42 |
| 6,594,600 | B1 | * | 7/2003 | Arnoul et al. .................... 702/94 |
| 7,106,421 | B2 | * | 9/2006 | Matsuura et al. ............. 356/4.01 |
| 7,312,724 | B2 | * | 12/2007 | Saito et al. ..................... 340/937 |
| 2002/0039136 | A1 | * | 4/2002 | Okamoto et al. ............. 348/148 |
| 2004/0212484 | A1 | * | 10/2004 | Su et al. ......................... 340/435 |
| 2004/0246471 | A1 | * | 12/2004 | Matsuura et al. .......... 356/141.4 |
| 2008/0031514 | A1 | * | 2/2008 | Kakinami ..................... 382/154 |
| 2008/0144924 | A1 | * | 6/2008 | Hoffmann ..................... 382/154 |

FOREIGN PATENT DOCUMENTS

EP 0 691 599 A2 1/1996

(Continued)

OTHER PUBLICATIONS

Schoepflin et al., "Dynamic Camera Calibration of Roadside Traffic Management Cameras for Vehicle Speed Estimation", IEEE Transactions on Intelligent Transportion Systems, vol. 4, No. 2, Jun. 2003, pp. 1-9.*

(Continued)

*Primary Examiner* — Dohm Chankong
(74) *Attorney, Agent, or Firm* — Crowell & Moring LLP

(57) ABSTRACT

An on-vehicle camera calibration apparatus includes: an on-vehicle camera; a camera parameter calculation unit configured to calculate camera parameters from a characteristic amount of a road surface sign photographed by the on-vehicle camera and recognized by an image processing and to output the camera parameters, wherein the camera parameters include an installation height and installation angle of the on-vehicle camera in photographing; and a camera parameter calibration unit configured to perform optical axis calibration control of the on-vehicle camera by the camera parameters output from the camera parameter calculation unit.

5 Claims, 9 Drawing Sheets

FOREIGN PATENT DOCUMENTS

| | | |
|---|---|---|
| JP | 7-77431 A | 3/1995 |
| JP | 2003-329411 A | 11/2003 |
| JP | 2004-200819 A | 7/2004 |

OTHER PUBLICATIONS

Grammatikopoulos et al., "An automatic approach for camera calibration from vanishing points", ISPRS Journal of Photogrammetry & Remote Sensing, 2007, pp. 1-13.*

Fung et al., "Camera calibration from road lane markings", Society of Photo-optical Instrumentation Engineers, Apr. 2003, pp. 1-11.*

Wang et al., "Camera Calibration by Vanishing Lines for 3-D Computer Vision", IEEE Transactions on Pattern Analysis and Machine Intelligence, vol. 13, No. 4, Apr. 1991, pp. 1-7.*

Caprile et al., "Using vanishing Points for Camera Calibration", International Journal of Computer Vision, 1990, pp. 1-13.*

Japanese Office Action dated Dec. 7, 2010 (Three (3) pages).

European Search Report dated Oct. 2, 2007 (Seven (7) pages).

* cited by examiner

CALIBRATION APPARATUS OF ON-VEHICLE CAMERA, PROGRAM, AND CAR NAVIGATION SYSTEM

BACKGROUND OF THE INVENTION

1. Field of the Invention

The present invention relates to a calibration apparatus of an on-vehicle camera (hereinafter referred to as "on-vehicle camera calibration apparatus" as needed) comprising an image processing device.

2. Description of the Related Art

In an on-vehicle camera comprising an image processing device, a role of the camera increasingly becomes important for the purpose of safe running of a vehicle, an advanced position calibration of a car navigation, and the like; and an image processing technology for enhancing an accuracy for recognizing an object on a road surface or on a road are variously proposed. However, in many cases an installation height and imaging angle of an on-vehicle camera attached to a vehicle change from an initial set condition over time due to such an up-down vibration, gravitation by a sudden acceleration and deceleration, and other impacts. In these cases, because accurate image processing information cannot be obtained, it becomes necessary to periodically calibrate an optical axis of the camera.

Therefore, there are introduced a method of using a reference marker, of which a relative position relationship to a vehicle is known, and calibrating an on-vehicle camera (for example, see claim 1 in Japanese Patent Laid-Open Publication No. 2004-200819); and a method of calculating an attitude parameter of an on-vehicle camera from a road vanishing point (for example, see claim 1 in Japanese Patent Laid-Open Publication No. H07-77431).

In the JP 2004-200819 it is necessary to prepare the reference marker for calibrating an optical axis calibration of the camera, and the calibration is not performed unless the vehicle is in a stop state. In the JP H07-77431 there are many restrictions in order that the road vanishing point becomes calculable (for example, paragraph 0054), and because the point is also easily influenced under a view condition due to weather, an opportunity when a favorable calibration can be performed is restricted.

Consequently, there is a need for an on-vehicle camera calibration apparatus that enables an optical axis calibration of the camera from information obtained at a higher frequency on a road even if the vehicle is running.

SUMMARY OF THE INVENTION

An on-vehicle camera calibration apparatus of the present invention comprises an on-vehicle camera, a camera parameter calculation unit configured to calculate a camera parameter from a characteristic amount of a road surface sign, and a camera parameter calibration unit configured to perform optical axis calibration control of the on-vehicle camera.

In accordance with the present invention, even if a vehicle is running, an on-vehicle camera calibration apparatus that enables an optical axis calibration of the camera from information obtained at a high frequency on a road.

BEST MODE FOR CARRYING OUT THE INVENTION

Here will be described an embodiment of the present invention in detail, referring to drawings.

Figure 1:
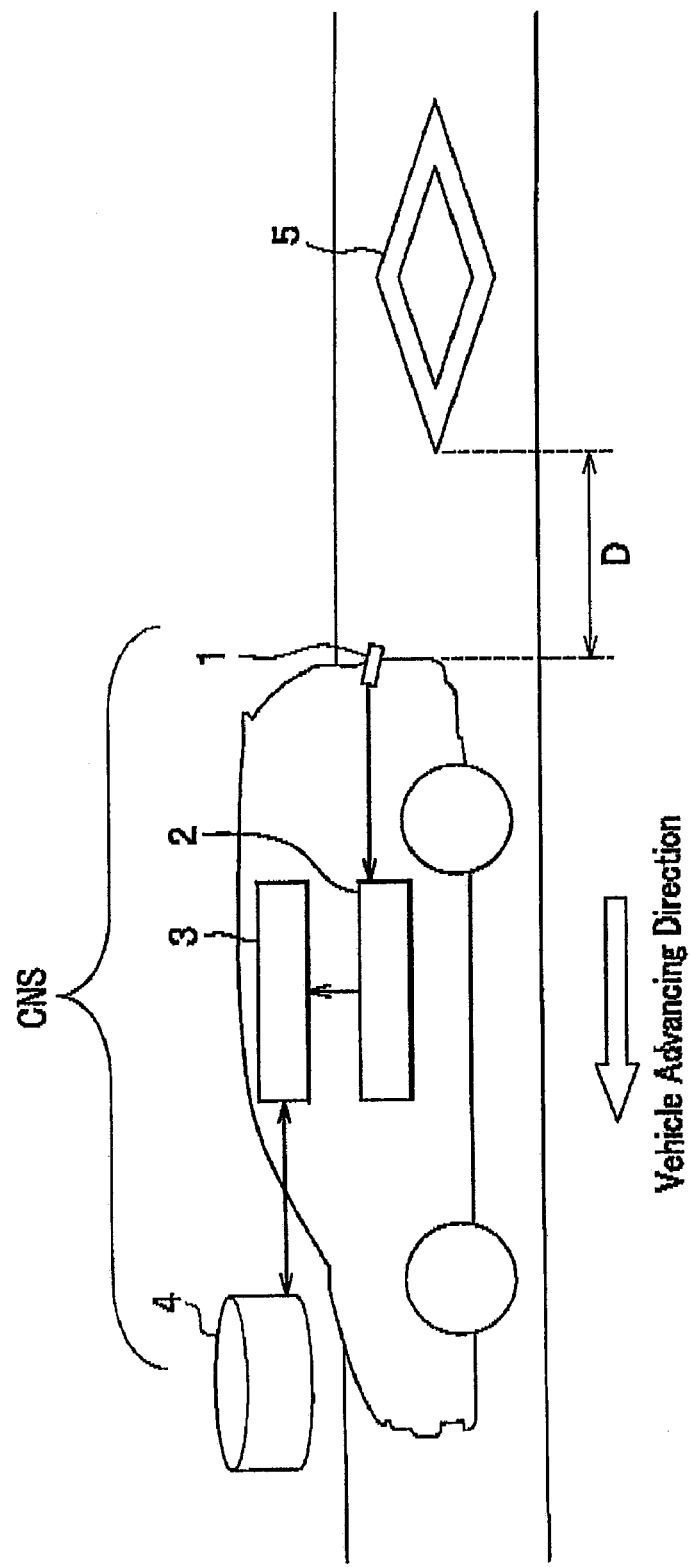
FIG. 1 is a drawing showing an example of a general configuration of an embodiment of the present invention.

FIG. 1 is a drawing showing an example of a general configuration of an on-vehicle camera calibration apparatus CA relating to the embodiment, including a peripheral system. The configuration shown in FIG. 1 is already put into practical use as part of a car navigation system CNS (hereinafter referred to as "car-navi" as needed), and further, an ITS (Intelligent Transporting System) 3 including a collaboration with an on-vehicle camera 1, an image processing device 2, and an map DB (data base) 4.

The on-vehicle camera 1 and the image processing device 2 are put into practical use for a purpose of calibrating position information of the car navigation 3 by image information from such a road surface sign 5 and a road sign, and for a purpose of monitoring for a safe running; and are also usable for the embodiment of the present invention. In the embodiment, although the on-vehicle camera 1 is attached to a rear of a user's own vehicle as a rear view camera, the camera 1 may also be placed at another position if it is possible to capture an image of the road surface sign 5. The image processing device 2 extracts any one of a predetermined characteristic point and characteristic line (hereinafter generically referred to also as "characteristic amount") from a captured image of the road surface sign 5; and from the extracted information, calculates a camera parameter with respect to an installation height and installation angle of the on-vehicle camera 1 and performs an optical axis calibration.

When the on-vehicle camera 1 and the image processing device 2 detect the road surface sign 5, of which position information (longitude and latitude) is known, and calculate a distance D between the user's own vehicle and the sign 5, for example, in order to calibrate the position information of the vehicle, it becomes possible to derive the distance D more accurately because the camera 1 and the device 2 similarly configured enable the optical axis calibration.

Figure 2:
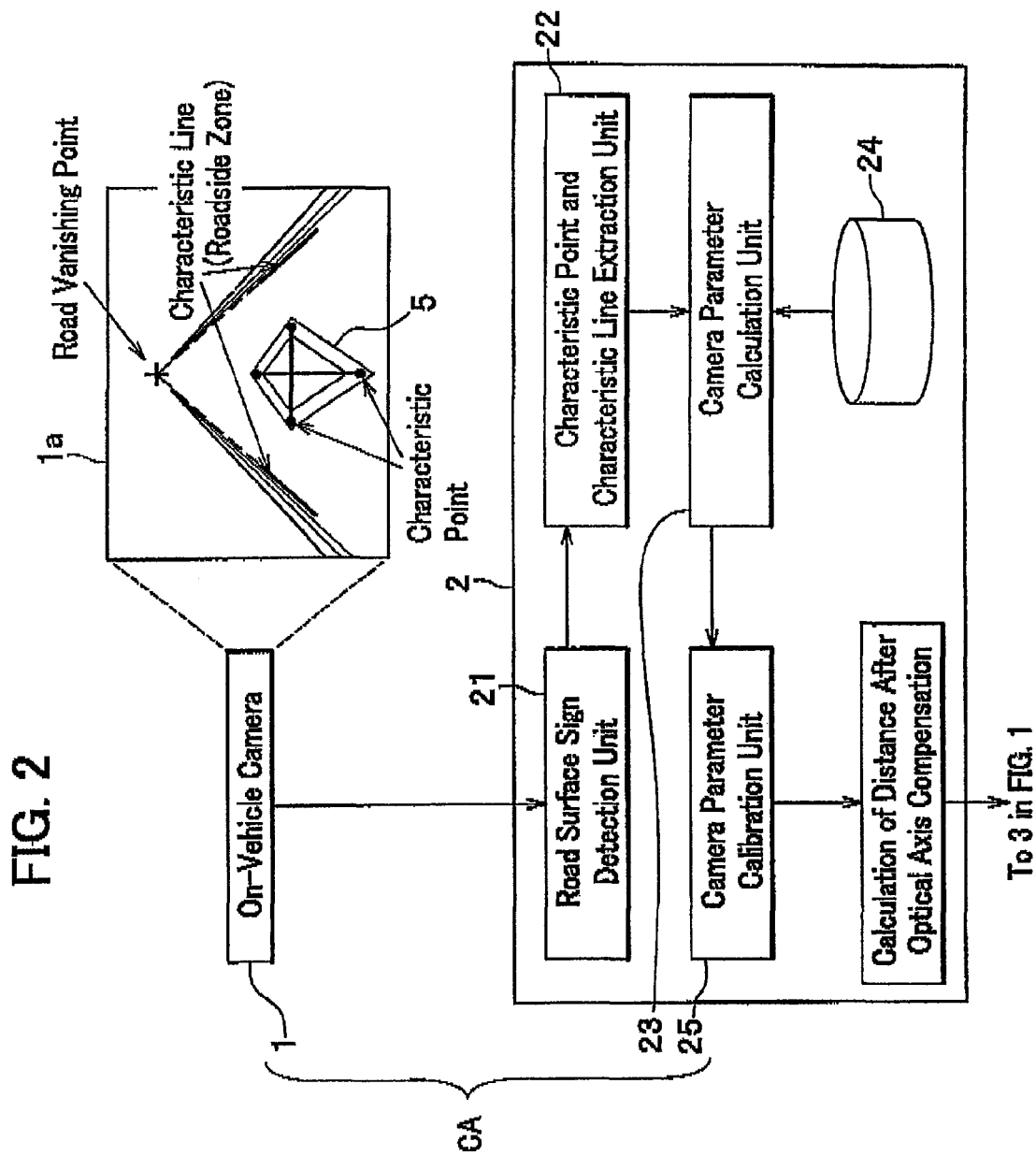
FIG. 2 is a detailed drawing showing an on-vehicle camera calibration apparatus of relating to the embodiment.

Next will be described the on-vehicle camera calibration apparatus CA of in detail based on FIG. 2. As shown in FIG. 2, the on-vehicle camera calibration apparatus CA comprises the on-vehicle camera 1 and a camera parameter calculation unit 23 and camera parameter calibration unit 25 of the image processing device 2.

In an image captured by the on-vehicle camera 1, any of a characteristic point and a characteristic line is included in such the road surface sign 5 as shown in the image 1a, and the image is sent to the image processing device 2. In the device 2 the input image is firstly processed in a road surface sign detection unit 21; a kind of the road surface sign 5 detected from the image is determined; the image is sent to a characteristic point and characteristic line extraction unit 22. Then in the unit 22 are extracted characteristic points (four, six, or eight points according to a kind) on a white line predetermined for every kind of the road surface sign 5; or in a case of a characteristic line, a point intersecting on an extension of two characteristic lines is made a road vanishing point, its coordinate position is derived, and the position is sent to the camera parameter calculation unit 28.

In the camera parameter calculation unit 23 the information of the obtained characteristic points is referred to that of a reference characteristic point stored in a road surface sign DB 24 for every kind of the road surface sign 6; and the installation height and installation angle of the on-vehicle camera 1 are calculated and sent to the camera parameter calibration unit 26 as a camera parameter. When the information sent from the characteristic point and characteristic line extraction unit 22 is the coordinate information of the road vanishing point, the installation height and installation angle of the on-vehicle camera 1 are calculated and sent to the camera parameter calibration unit 25 as the camera parameter.

The camera parameter calibration unit 25 updates and memorizes the camera parameter sent from the camera parameter calculation unit 23 as a new camera parameter, performs an image processing (not shown), for example, by an image and a camera parameter for deriving the distance D for a car-navi position calibration, and send out the information to the car navigation 3.

Furthermore, the camera parameter calibration unit 25 issues a notice of maintenance and manually prompts a modification of a camera attachment position, when a displacement of the optical axis of the on-vehicle camera 1 exceeds a predetermined range displacement of the optical axis of the on-vehicle camera 1 and the optical axis calibration is difficult.

Here will be described an outline of the optical axis calibration (hereinafter referred to as "calibration") of the on-vehicle camera 1 in the embodiment.

Firstly, in attaching the on-vehicle camera 1, it is attached (not shown) at a place such as an inspection place before new vehicle shipping or a general maintenance shop where a reference marker for the calibration exists. The on-vehicle camera 1 attached to a vehicle captures the reference marker from a position with a definite distance from the marker, and obtains initial set values (height h, pitch angle $\theta$, roll angle $\phi$, yaw angle $\psi$) with respect to the installation position of the camera 1. Then in the information of characteristic points described later, a shape of the road surface sign 5 seen from the position (the angles) of the on-vehicle camera 1 is converted to a screen coordinate system, based on the initial set values, and is stored in the road surface sign DB 24 as kind determination use. In addition, at this timing, because the optical axis calibration of the on-vehicle camera 1 is not necessary, the initial set values are used when a position calibration (measurement of the distance D) in the car-navi 3 or an image processing for a safe running is performed.

Next, a period is set for performing the calibration For example, in setting a default, the period is assumed to be from a previous calibration performance to a first vehicle driving timing after one week from the performance, and to be changeable to an arbitrary period by a user. Furthermore, the instruction of the calibration is also assumed to be manually possible by a user; the instruction of the calibration is preferably adapted to be manually performed, for example: at a time when the user's own vehicle proceeds into a general road from mountain road running whose road condition is bad; and at a temporary stop at a position where a favorable road surface sign 5 exists after the user's own vehicle.

Figure 8:
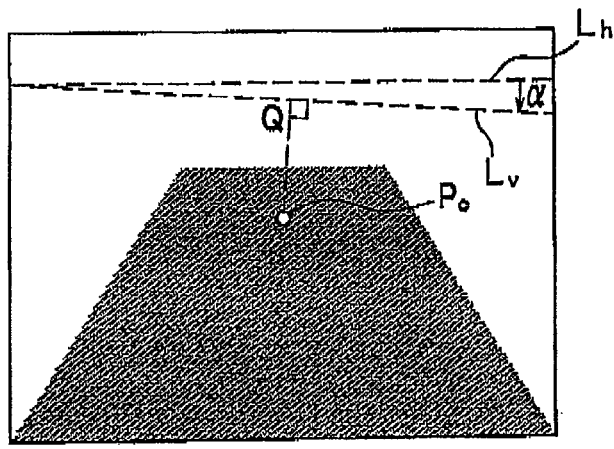
FIG. 8 is a drawing showing an example of calculating a roll angle and pitch angle of an on-vehicle camera relating to the embodiment.

FIG. 8 is the flowchart of the calibration being performed in any one of a default timing and a manual timing, using the road surface sign 5 at any one of a running and a stop.

Firstly, even in any one of the default timing and the manual timing, in cases of such a high speed running and a sudden acceleration, because any of an image and the optical axis of the on-vehicle camera 1 becomes unstable, the timing is determined whether or not to be suitable for performing the calibration (step S301). A specific determination element will be described later. When the determination is Yes, the processing proceeds to the next step (step S302); when No, the processing ends.

In the next step (S302) the on-vehicle camera 1 captures an image of a road surface, and the image is input in the road surface sign detection unit 21. In the unit 21 an image processing for a road surface sign detection is performed (step S303).

Figure 4:
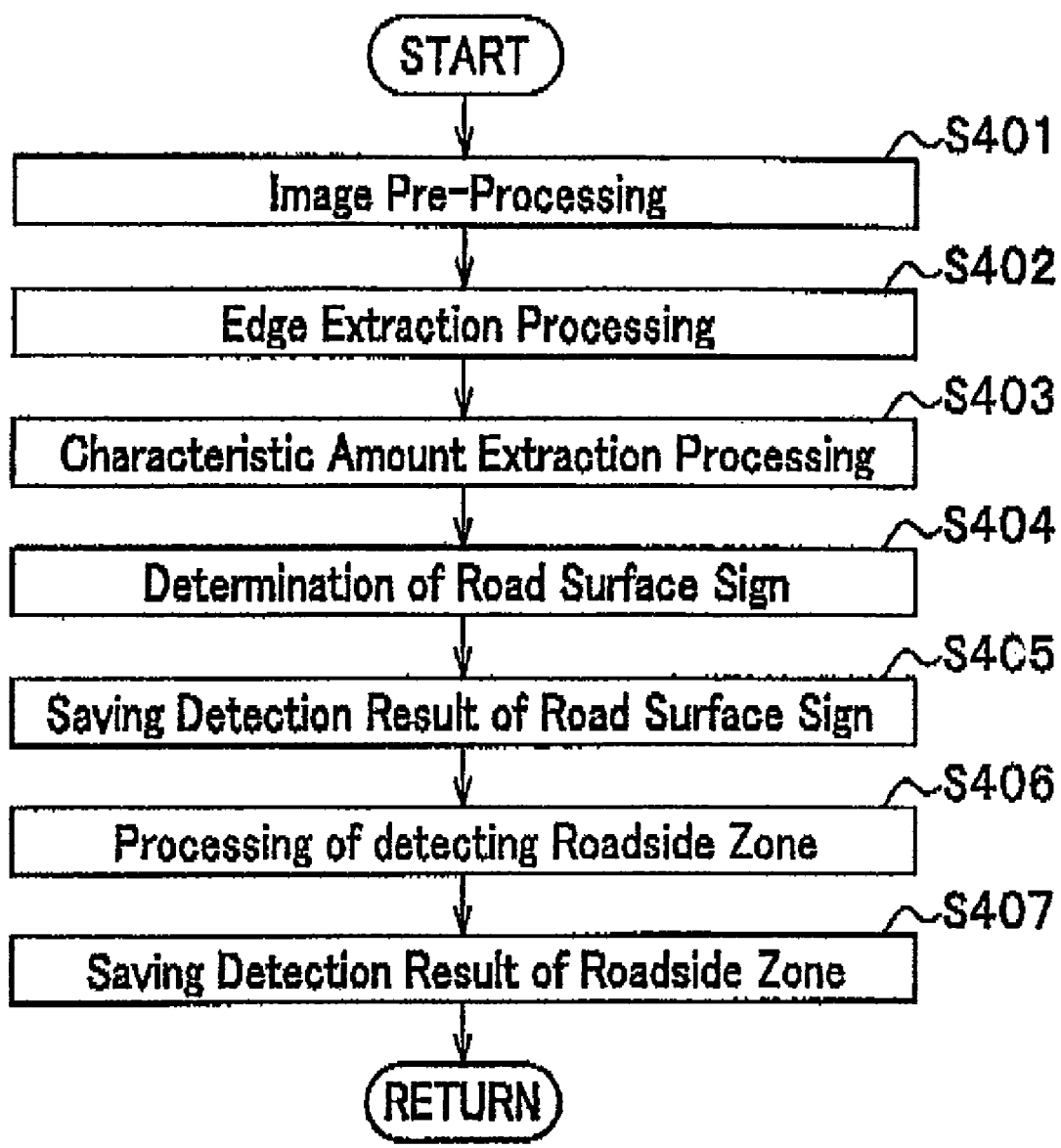
FIG. 4 is a flowchart showing a detailed procedure of a road surface detection processing in FIG. 3.

FIG. 4 is the flowchart showing the detail (subroutine) of the image processing of the step S303 in the road surface sign detection unit 21.

Firstly, a pre-processing such as a contrast adjustment is performed (step S401); secondly, an identification of a white line (or yellow line) on a road surface is made easier by an edge extraction processing (step S402). Next, from a profile of any one of a corner and cut of the white line in the road surface sign 5, the road surface sign detection unit 21 extracts some points (characteristic point or characteristic amount) representing a characteristic of the shape of the profile (step S403). Then the road surface sign detection unit 21 refers to the information of the screen coordinate system registered in advance in the road surface sign DB 24, determines which kind of the road surface sign 5 the characteristic amount corresponds to (step S404), and saves the detection result of the road surface sign 5 (step S405). When the road surface sign detection unit 21 detects two parallel straight lines where any one of a corner and a cut is not recognized, the unit 21 determines that the two-lines are white lines respectively showing roadside zones (characteristic lines), performs the detection processing of the white lines (step S406), and saves the result (step S407). After the completion of the subroutine, if the road surface sign detection unit 21 has detected any one of the road surface sign 5 and the roadside zones, in the next step S304, according to the result of the step S303, the processing proceeds to a step S305 of the characteristic amount extraction for the camera parameter calculation (Yes in the step S304 of FIG. 3). When the road surface sign detection unit 21 cannot detect from the image any one of the road surface sign 5 and the roadside zones due to some reason, the processing proceeds to a step S311 (No in the step S304 of FIG. 3) described later.

Figure 5:
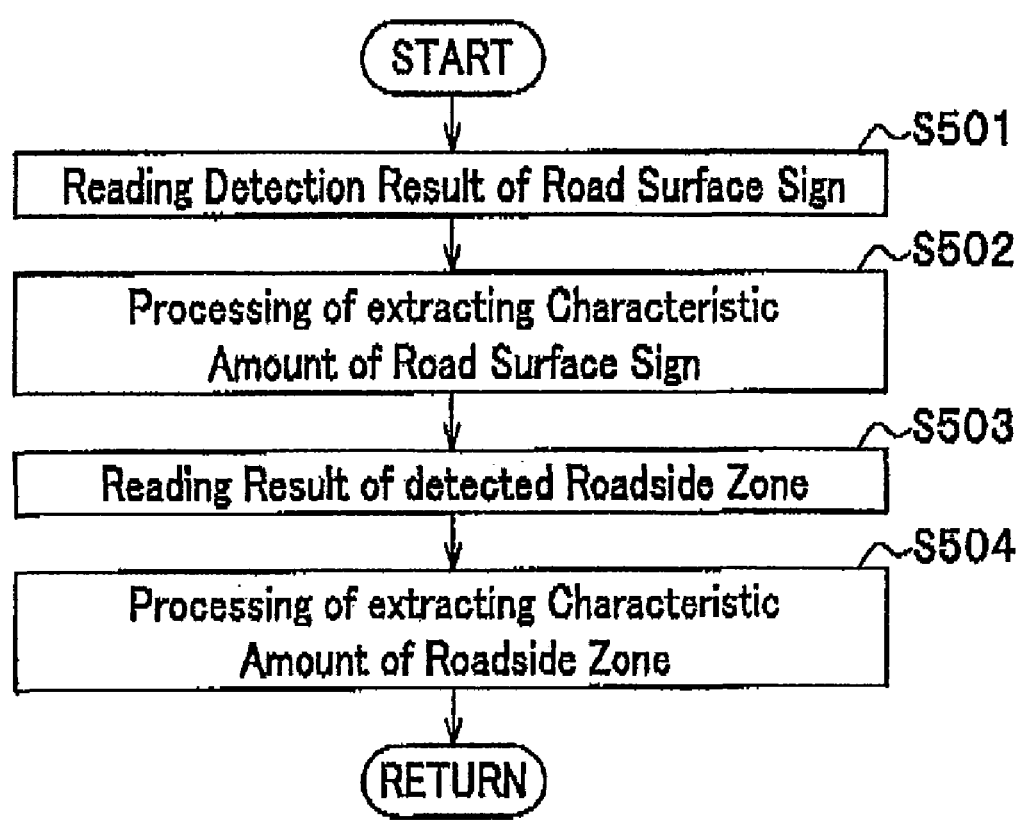
FIG. 5 is a flowchart showing a detailed procedure of a characteristic amount extraction for a camera parameter calculation in FIG. 3.

FIG. 5 is the flowchart showing the detail of the characteristic amount extraction (step S305 of FIG. 3) for the camera parameter calculation in the characteristic point and characteristic line extraction unit 22.

The characteristic point and characteristic line extraction unit 22 reads the detection result of the road surface sign 5 saved in the step S405 (step S501), and extracts a characteristic amount corresponding to that (an example will be described later) defined for every kind of the road surface sign 5 (step S502). Furthermore, the characteristic point and characteristic line extraction unit 22 reads the detection result of the characteristic lines of the roadside zones (two parallel lines) saved in the step S407 (step S503), and extracts the position information of the two points with a definite interval from the respective characteristic lines, that is, the position information of total four points, as the characteristic amount (step S504).

Figure 3:
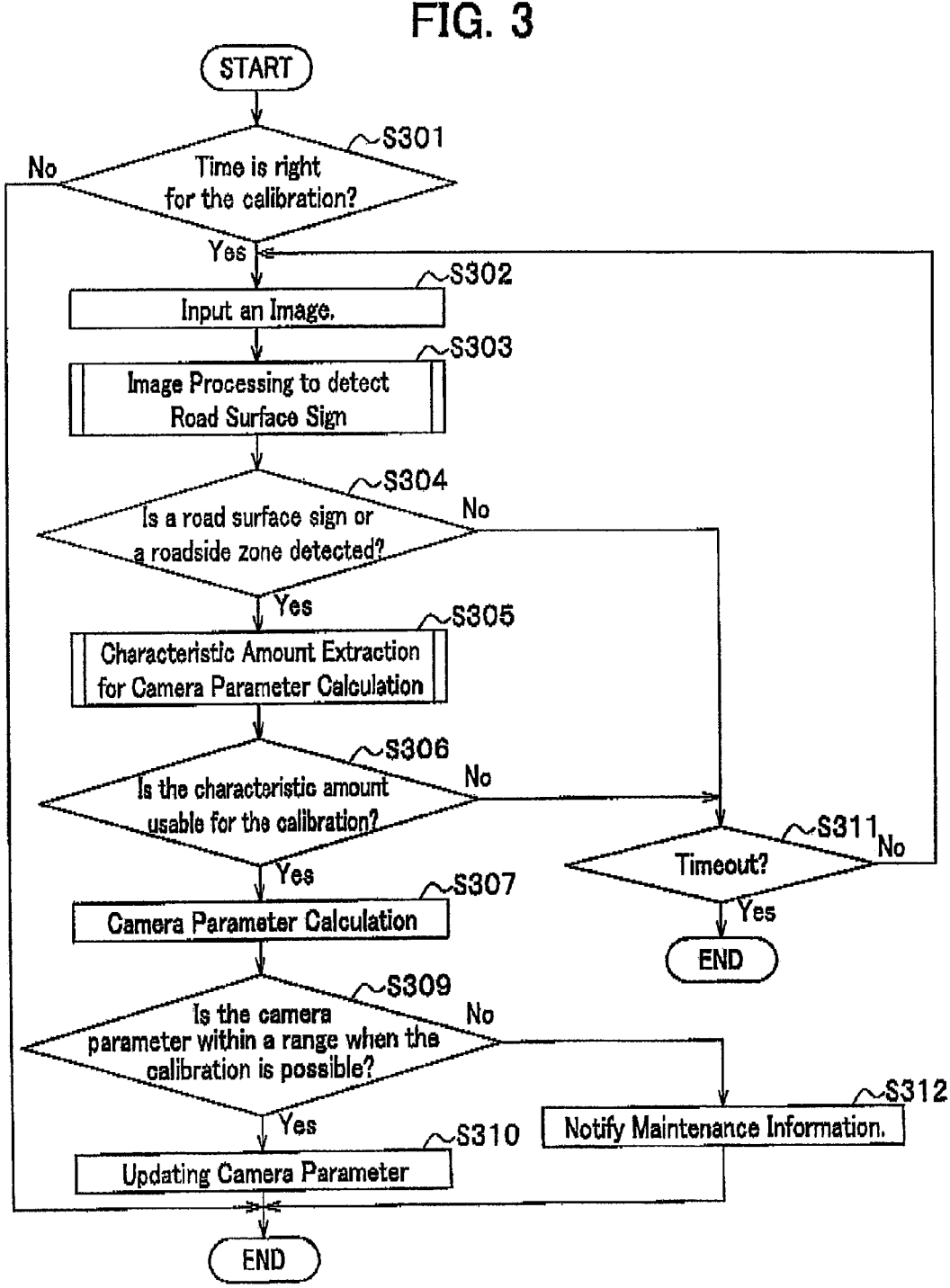
FIG. 3 is, in the embodiment, a drawing showing a procedure for performing a calibration, using a road surface sign, by means of a flowchart.

Then when the characteristic point and characteristic line extraction unit 22 can extract a predetermined characteristic amount from any on e of the steps 502 to 604, the processing proceeds to a stop S307 (Yes in a step S306 of FIG. 3); when the unit cannot extract the predetermined characteristic amount from any one of the steps 502 to 504, the processing proceeds to the step S311 (No in the step S306 of FIG. 3).

When proceeding to the step S311 from No in the step S304 or No in the step S306, the processing returns to the image input S302 (o in the step S311); when again returning to the step S311 from the step S304 or the step S306, the processing returns to the step S302 and is repeated before a predetermined number of times (for example, total five times) or a predetermined time (for example, for five minutes) is reached; and when the predetermined number of the times or the predetermined time is reached, the processing ends as timeout.

Next, when the processing proceeds from the step S306 to the step S307, if a characteristic amount for the camera parameter calculation sent from the characteristic point and characteristic line extraction unit 22 is a characteristic point of the road surface sign 5, the camera parameter calculation unit 23 refers to the characteristic point and reference dimension information of a characteristic point according to the kind of the road surface sign 5 stored in the road surface sign DB 24, and calculates camera parameters (height h', pitch angle θ', roll angle φ', yaw angle ψ') of the on-vehicle camera 1 in capturing the image. A detailed calculation example will be described later. When the characteristic amount is obtained from the characteristic lines of two roadside zones (see the image 1a in FIG. 2), the camera parameter calculation unit 23 derives coordinates on the image of a point (road vanishing point), which is an intersection of the characteristic lines on an extension thereof, and calculates the camera parameters of the on-vehicle camera 1. A method for calculating the camera parameters from the road vanishing point is introduced in the JP H07-77431 and other document. The calculated camera parameters are sent to the camera parameter calibration unit 25.

Then the camera parameter calibration unit 25 determines whether or not the calculated camera parameters respectively exceed thresholds that can be calibrated; when any one of the parameters exceeds its threshold and the calibration is determined impossible (No in a step S309), a position displacement of the on-vehicle camera 1 is large; and therefore, the unit 25 notices a user of maintenance information and prompts to modify the installation position or angles of the camera 1 (step S312). When the camera parameters are not more than the thresholds, the camera parameter calibration unit 25 determines that the calibration is possible (Yes in the step S309), updates (memorizes) the parameters (step S310), performs, for example, an image processing for calculating the distance D, using the parameters, and sends the image processing information (position information) after the optical axis calibration to the ITS (car-navi) 3.

Thus it is possible to perform the calibration of the on-vehicle camera 1, and here will be described the road surface sign 6 that is an object of an imaging.

A kind and format of the road surface sign 5 are defined in the road traffic law; in the embodiment, selecting the sign 5 of which a dimension is nationally unified or specified according to an area, a characteristic point of a reference is defined for every kind of the sign 5. In the characteristic point four to eight points are needed in order to derive two pairs of parallel segments; in FIGS. 6A, 6B, and 6C are shown some road surface signs 5 and examples of dimensions and characteristic points thereof.

Figure 6A:
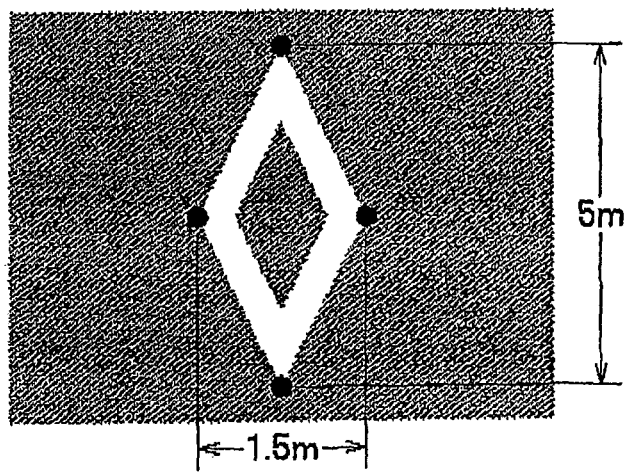
FIGS. 6A, 6B, and 6C are drawings respectively showing examples of characteristic points of road surface signs relating to the embodiment.
Figure 6B:
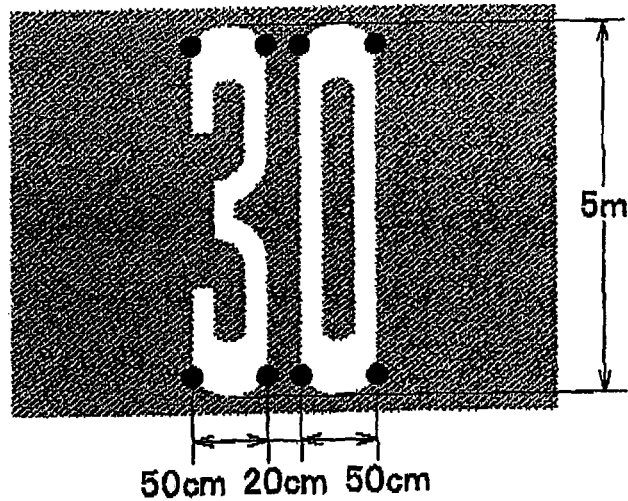
Figure 6C:
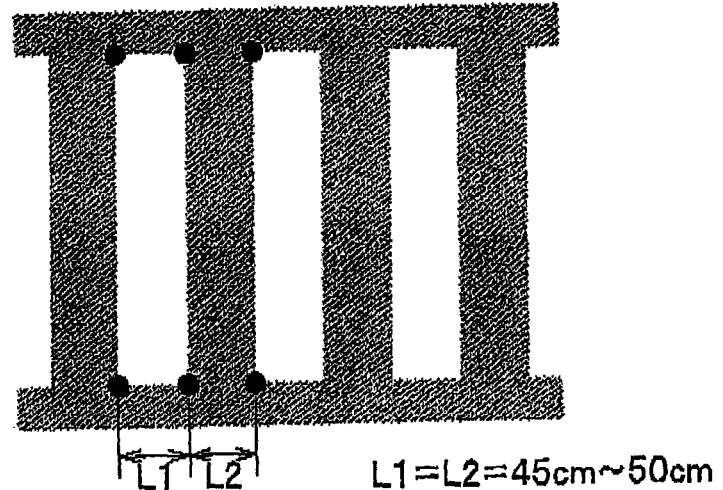

FIG. 6A is the road surface sign 5 indicating that there exists a pedestrian crossing or a bicycle crossing zone ahead. In a width of the white line either 20 cm or 30 cm is used according to an area, and in some cases a cut is provided in the white line in order that rainwater is not accumulated inside the sign 5; however, an outside dimension is unified as shown and the sign 6 is marked on a road surface symmetrically in left-right and front-rear; the dimension of four characteristic points of a black circle is nationally common. Similarly, with respect to the maximum speed of 30 km/hour in FIG. 6B, even if the width of the white line (yellow line) is different, the dimension of eight characteristic points defined on the outer edges of the road surface sign 5 is not changed. Furthermore, like the road surface sign 5 of a pedestrian crossing in FIG. 6C, when the dimension of the sign 5 is not nationally unified and is standardized per an area (prefecture), it is possible to utilize many road surface signs 5 by storing the information of six characteristic points in the road surface sign DB 24 per the area, referring to the position information from the car-navi 3 in performing the calibration, and reading the characteristic point information per the area.

Next will be described a calculation example of the camera parameters from the characteristic points of the road surface signs 5 described above, and a calculation example for deriving the distance D, using the calculated camera parameters.

Firstly, an extracted characteristic point is calibrated into a state where there exists no lens distortion. In order to calibrate a lens distortion, it is possible to calibrate a characteristic point of an input image into a state where there exists no lens distortion by using data of a unique distortion amount of the lens used in a camera. As this method, a known method can be used.

Next, a camera parameter is calculated from a characteristic point where no lens distortion exists.

Figure 7A:
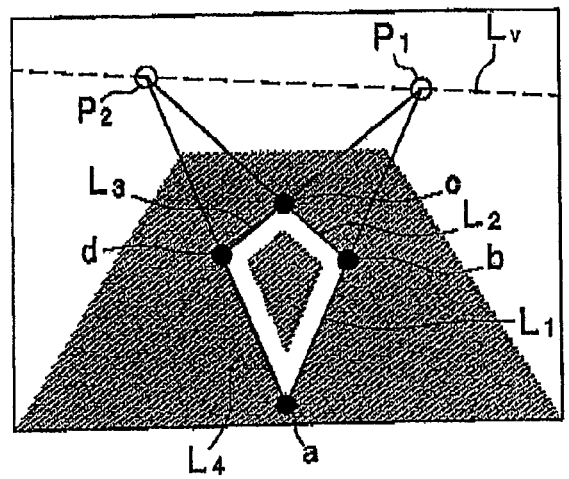
FIGS. 7A, 7B, and 7C are drawings respectively showing examples of deriving vanishing lines from the characteristic points of the road surface signs relating to the embodiment.

Firstly, two vanishing points are calculated from predetermined points (four, six, or eight points) and vanishing lines are derived from the vanishing points. Accordingly, two pairs of parallel segments are extracted from characteristic points defined in the kind of the road surface sign 5. The two pairs are preferably orthogonal with each other. In a case of the road surface sign 5 "Warning of Pedestrian Crossing or Bicycle Crossing Zone" shown in FIG. 7A, a, b, c, and d are the characteristic points; segments $L_1$ and $L_3$ are parallel on a road plane; segments $L_2$ and $L_4$ are parallel on the road plane, and these two pairs of the parallel segments are in a position relationship near a right angle. Therefore, on the image a line Lv is the vanishing line, wherein an intersection $P_1$ of straight lines from which the segments $L_1$ and $L_3$ are extended and, an intersection $P_2$ of straight lines from which the segments $L_2$ and $L_4$ are extended.

Figure 7B:
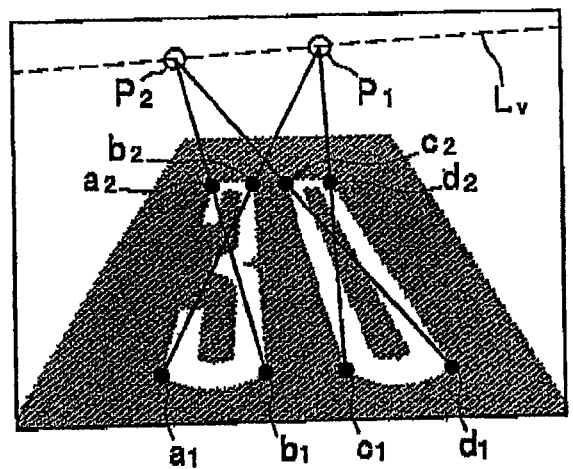

In a case of the road surface sign 5 "Maximum Speed 30 km/hour" shown in FIG. 7B, the vanishing line Lv can be derived from the intersections $P_1$ and $P_2$ by using the eight characteristic points, wherein the $P_1$ is assumed to be a point where an extension line of characteristic points $a_1$ and $b_2$ and that of characteristic points $c_1$ and $d_2$ intersect on the image, and the $P_2$ is assumed to be a point where an extension line of characteristic points $b_1$ and $a_2$ and that of characteristic points $d_1$ and $c_2$ intersect on the image. In addition, the vanishing line Lv can be derived from: an intersection of an extension line of characteristic points $a_1$ and $a_2$ and that of characteristic points $b_1$ and $b_2$; and an intersection of an extension line of characteristic points $c_1$ and $c_2$ and that of characteristic points $d_1$ and $d_2$. However, the extension lines are not segments nearly orthogonal with each other, the intersections $P_1$ and $P_2$ are positioned near on the image, and therefore, it is difficult to obtain the vanishing line Lv of which an accuracy is higher.

Figure 7C:
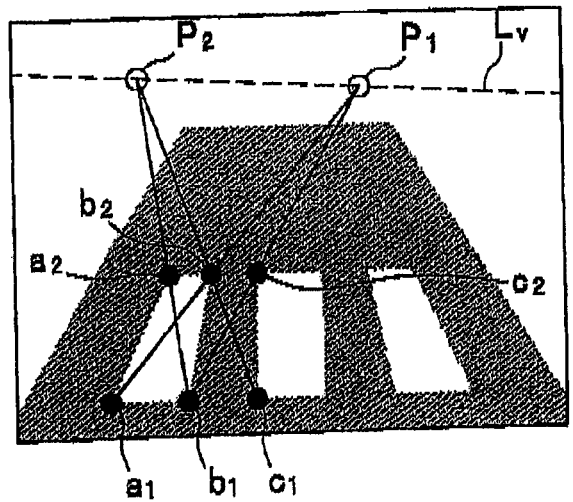

In a case of the road surface sign 5 "Pedestrian Crossing" shown in FIG. 7C, because intervals between characteristic points $a_1$ and $b_1$, and $b_1$ and $c_1$, and those between characteristic points $a_2$ and $b_2$, and $b_2$ and $c_2$ are same (45 cm or 50 cm), two pairs of parallel segments can be obtained from the six characteristic points, and thus the vanishing line Lv can be derived from the intersections $P_1$ and $P_2$ on the image.

Next, the roll angle $\phi'$ of the on-vehicle camera 1 is derived from the derived vanishing line Lv. In FIG. 8, draw a straight line Lh parallel to a horizontal axis of the screen, and then an angle $\alpha$ made by the line Lh and the vanishing line Lv derived above is the roll angle $\phi'$.

Next, the pitch angle $\theta'$ of the on-vehicle camera 1 is derived. In FIG. 8, assume a point Pc to be the center of the screen, and drop a perpendicular line PcQ on the vanishing line Lv from the Pc. Here, assume a focus distance of the on-vehicle camera 1 to be f; then, the pitch angle $\theta'$ is:

$$\theta'=\tan^{-1}\{(\text{distance of the segment } PcQ \text{ on the image})/f\}$$

The focus distance f is known as a unique value of the on-vehicle camera 1, and the distance of the segment PcQ on image can be derived because a unit cell size on the image is known.

Figure 9:
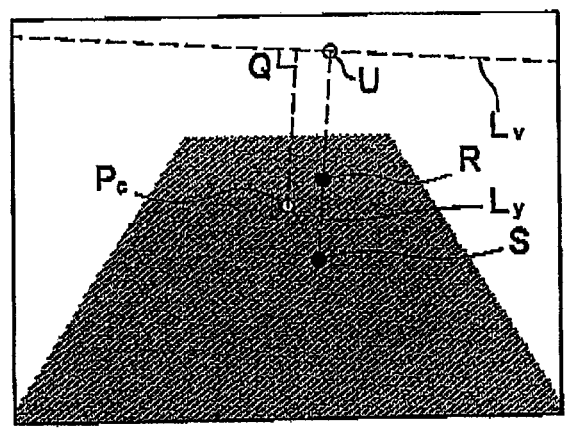
FIG. 9 is a drawing showing an example of calculating a yaw angle of the on-vehicle camera relating to the embodiment.

Next, the yaw angle $\psi'$ of the on-vehicle camera 1 is derived. In FIG. 9, assume the line Lv to be the vanishing line and the point Pc to be the center of the screen. Furthermore, RS is an orbit between frames of the road surface sign 5, and means that a characteristic point positioned on a point S on the image of a current frame is positioned on a point R on the image before a few frames. Here, a straight line connecting the points R and S is assumed to be Ly, and an intersection of the straight line Ly and the vanishing line Lv is assumed to be U. In addition, the point U is uniquely derived even if the point S (point R) is any characteristic point. Furthermore, the point Q in FIG. 9 is similar to that in FIG. 8. The yaw angle $\psi'$ of the on-vehicle camera 1 is expressed as:

$$\psi'=\tan^{-1}((\text{distance of the segment } QU \text{ on the image})\times \cos\theta'/f),$$

where $\theta'$ is is the pitch angle of the on-vehicle camera 1 derived above, the focus distance f is known as the unique value of the camera 1, and the distance of the segment QU on the image can be derived because a unit cell size on the image is known.

Figure 10:
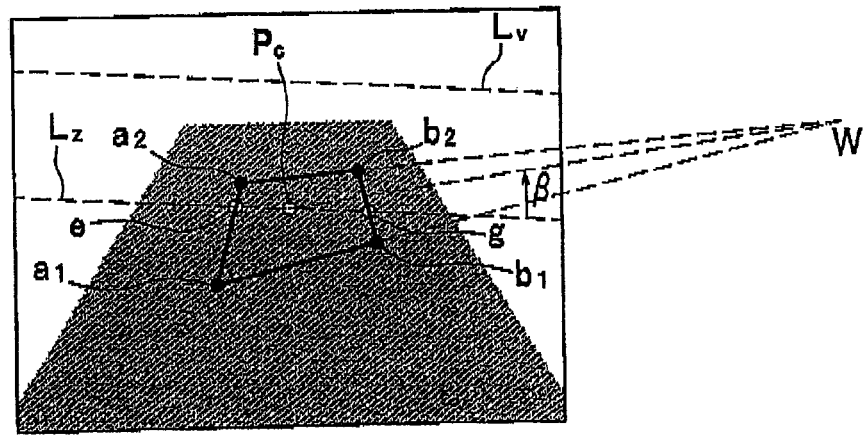
FIG. 10 is a drawing showing an example of calculating a height of the on-vehicle camera relating to the embodiment.

Next, the height h' of the on-vehicle camera 1 is derived. In FIG. 10, the line Lv is the vanishing line; a line Lz is a straight line that passes the center point Pc of the screen and is in parallel to the vanishing line Lv. Here, assume the characteristic points of the road surface sign 5 detected previously to be $a_1$, $a_2$, $b_1$, and $b_2$; and consider a case of a quadrangle $a_1a_2b_1b_2$ becoming a rectangle on the road (any one of such the road surface signs 5 of a pedestrian crossing and a maximum speed). Furthermore, assume an intersection of straight lines $a_1b_1$ and $a_2b_2$ to be W, and an angle on the screen made by a straight line PcW and the straight line Lz to be $\beta$. Firstly, when intersections of the quadrangle $a_1a_2b_1b_2$ and the straight line Lz are assumed be points e and g, a practical length EG is derived on the road surface. Then assume a length of the segment $a_1b_1$ to be $A_1B_1$; and thus the length EG is expressed as:

$$EG=A_1B_1/\cos\{\tan^{-1}(\tan\beta/\sin\theta')\}, \quad (1)$$

where $\theta'$ is the pitch angle of the on-vehicle camera 1 previously derived, and $A_1B_1$ is uniquely derived because the dimension of the road surface sign 5 is standardized. Next, a ratio of the practical length EG on the road surface to a length of a segment eg on the image is derived:

$$\text{Ratio}=EG/(\text{length of the segment } eg \text{ on the image}) \quad (2)$$

Assume the focus distance of the on-vehicle camera 1 to be f, and then the height h' of the cetera 1 is expressed as:

$$h'=f\times\text{Ratio}\times\sin\theta' \quad (3)$$

Thus according to the equations (1) to (3), the installation height h' of the on-vehicle camera 1 can be derived.

Thus from the characteristic points of the road surface sign 5 detected can be calculated current camera parameters (height h', pitch angle $\theta'$, roll angle $\phi'$, yaw angle $\psi'$ of the on-vehicle camera 1), and then by assuming these to be the camera parameters after calibration, the distance D from the user's own vehicle to the road surface sign 5 can be derived.

Figure 11A:
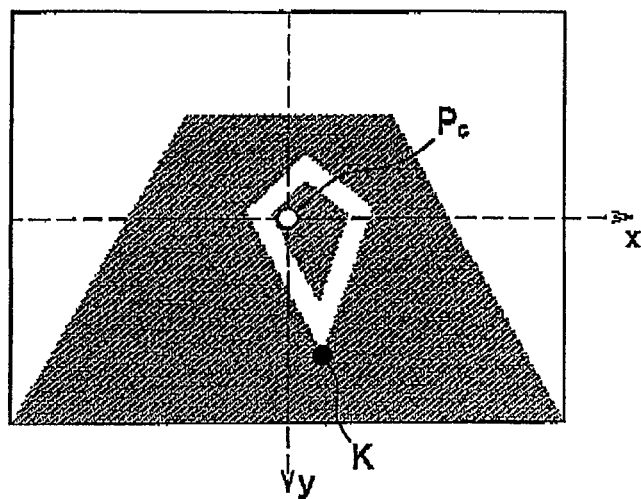
FIGS. 11A and 11B are drawing showing an example of a position calibration of a user's own vehicle from a camera parameter of the on-vehicle camera relating to the embodiment.

Next will be described a method for deriving the distance D from the user's own vehicle to the road surface sign S. Here, a representative point means a point corresponding to the position information (latitude and longitude) of the road surface sign 5, and may also be a characteristic point for calculating the camera parameters. In FIG. 11A, consider to derive the distance D from the user's own vehicle to a representative point K. Assume a screen coordinate system of which an origin is the screen center Pc to be (x, y), and coordinates of the point K to be (xk, yk). However, assume values of (xk, yk) to be on the image.

The coordinates (xk, yk) of the representative point K are derived specifically as follows:

A relative position of the representative point K inside the road surface sign 5 and a calculation method of the point K based on characteristic points are defined in advance for every road surface sign 5. For example, the representative point K in FIG. 6A is defined in advance to be the center of the rhombus. Then the calculation method of the representative point K in FIG. 6A is defined in advance to make an intersection of segments where characteristic points facing each other are connected. In some road surface sign 5, if any, a characteristic point itself may also be assumed to be the representative point K.

Figure 11B:
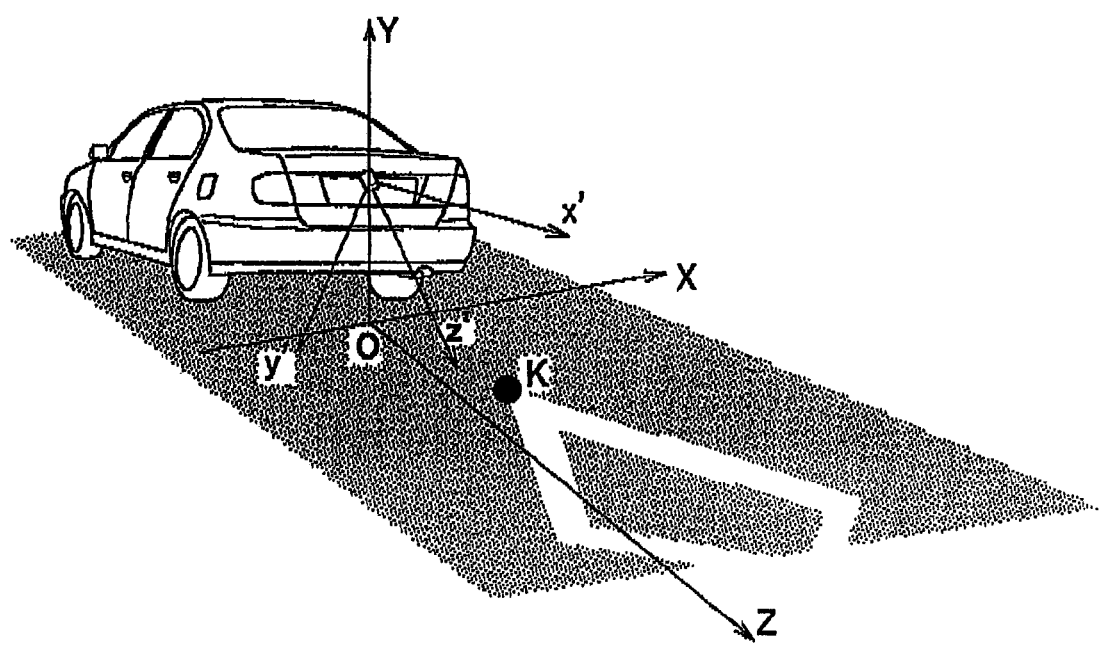

In FIG. 11B, assume a coordinate system on the road surface to be (X, Y, Z). Then assume that: the Z-axis is parallel to a longitudinal direction of the user's own vehicle; the K-axis is parallel to a lateral direction of the vehicle; the Y-axis is vertical to the road surface; an XZ plane is the road surface; and an origin O is just below the on-vehicle camera 1. Assuming coordinates of the representative point K in an XYZ coordinate system to be (Xk, 0, Zk), then the distance D from the vehicle (just below the on-vehicle camera 1) to the point K is expressed according to the following equation (4):

$$D=\sqrt{Xk^2+Zk^2} \quad (4)$$

Next, in FIG. 11B, assuming that a camera coordinate system consists of (x', y', z') and that: the z'-axis is an optical axis direction of the on-vehicle camera 1; the x'-axis is a lateral direction in an image of the camera 1; the y'-axis is a longitudinal diction in the image; and an origin is a center of a lens (center of the image). Here, a relationship between the XYZ coordinate system and the x'y'z' coordinate system is calculated according to the following equation (5):

$$\begin{bmatrix} x' \\ y' \\ z' \end{bmatrix} = \begin{bmatrix} -\cos\phi' & -\sin\phi' & 0 \\ \sin\phi' & -\cos\phi' & 0 \\ 0 & 0 & 1 \end{bmatrix}$$
$$\begin{bmatrix} 1 & 0 & 0 \\ 0 & \cos\theta' & \sin\theta' \\ 0 & -\sin\theta' & \cos\theta' \end{bmatrix} \begin{bmatrix} \cos\psi' & 0 & -\sin\psi' \\ 0 & 1 & 0 \\ \sin\psi' & 0 & \cos\psi' \end{bmatrix} \begin{bmatrix} X \\ Y-h' \\ Z \end{bmatrix}, \quad (5)$$

where in the on-vehicle camera 1, $\phi'$ is the roll angle, $\theta$ is the pitch angle, $\psi$ is the yaw angle, and h' is the installation height.

Next, a relationship between the camera coordinate system in FIG. 11B and the screen coordinate system in FIG. 11A is calculated according to the following equation (6):

$$x=f\times X'/Z'; \ y=f\times Y'/Z', \quad (6)$$

where f is the focus distance of the on-vehicle camera 1.

Thus according to the equations (4) to (6), the distance D from the user's own vehicle to the representative point K can be derived.

At the representative point K, because its position information (latitude and longitude) is known, it is possible to display more accurate position information of the user's own vehicle on the car navigation 3 according to the position information and the distance D derived above.

As described above, by utilizing various road surface signs 5 and roadside zones in extracting the characteristic amount, it is possible to perform the calibration at a higher frequency in any one of a running and stop of the user's own vehicle.

In addition, even if there exists a favorable road surface sign 5 around the user's own vehicle, there is a situation not suitable for the calibration due to another reason. In this case it is requested that in the step S301 the situation be determined not to be suitable for performing the calibration, and that capturing an image be prohibited. Although an example of the situation and the determination is shown as follows, the prohibition is not limited to the example. Furthermore, if permitting an image in a state below to be captured, because an end due to a timeout is enabled in the step S311 of FIG. 3, it is not necessary to strictly control all of the followings: In reality, it is preferable to individually define determination criteria according to the performances of the on-vehicle camera 1 and the image processing device 2.

(1) When a vehicle is running at a high speed, the optical axis of the on-vehicle camera 1 becomes unstable and an image quality becomes bad due to such a vibration of the vehicle; therefore, when a running speed exceeds a definite range, capturing an image is prohibited.

(2) When a vehicle is in any state of a sudden acceleration and deceleration, the optical axis of the on-vehicle camera 1 becomes unstable; and therefore, information of such a gyro sensor is referred and a threshold is provided in an acceleration rate (deceleration rate), and when a driver presses any one of an accelerator and a brake, capturing an image is prohibited.

(3) If a weight of a fellow passenger and a baggage exceeds a definite range, and a vehicle height lowers, the height of the on-vehicle camera 1 similarly lowers. Accordingly, a sensor that can measure the vehicle weight or the vehicle height is provided and a threshold suitable for the calibration is set.

(4) When there does not exist a parallel relationship between a proceeding direction of a vehicle and a road direction, the characteristic amount of the road surface sign 6 and the roadside zones cannot be obtained accurately; therefore, the calibration is kept from being performed from a time when a driver operates a wheel until after a few seconds after he/she returns the wheel.

In addition, the on-vehicle camera calibration apparatus CA relating to the embodiment of the present invention is realized by dedicated hardware; and additionally, may be performed by recording a program for realizing a function of the apparatus CA in a computer readable recording medium, and by making the program recorded in the medium to be read in a computer system. In addition, other than recording media such as a flexible disk, a hard disk, and an optical disk, the computer readable recording medium includes any one of: a recording medium that dynamically holds a program as in a case of the program being transferred through a communication medium of such the Internet; and a recording medium that holds the program for a definite time like a volatile memory possessed by a server when the present invention is performed.

What is claimed is:

1. An on-vehicle camera calibration apparatus comprising:
an on-vehicle camera;
a road surface sign detection unit configured to photograph a road surface by way of the on-vehicle camera and to detect a road surface sign;
a characteristic amount extraction unit configured to calculate a characteristic point or a characteristic line of the road surface sign from an image detected by the road surface sign detection unit, the characteristic amount extraction unit recognizing an image of the road surface sign photographed by the on-vehicle camera through image processing, and deriving a characteristic amount corresponding to the characteristic point or the characteristic line from characteristic amounts defined in advance for every kind of road surface sign;
a camera parameter calculation unit configured to calculate camera parameters from a characteristic amount of the road surface sign extracted by the characteristic amount extraction unit and a size of the characteristic amount of the road surface sign derived from a road surface sign database, the camera parameters including an installation height and installation angle of the on-vehicle camera in photographing; and
a camera parameter calibration unit configured to perform optical axis calibration control of the on-vehicle camera by the camera parameters output by camera parameter calculation unit, the camera parameter calculation unit extracting two parallel segments from the characteristic amount of the road surface sign extracted by the characteristic amount extraction unit, deriving at least two vanishing points and calculating camera parameters, and outputting the camera parameters to the camera parameter calibration unit.

2. The on-vehicle camera calibration apparatus according to claim 1, wherein when the road surface sign is different in any one of a dimension and a shape according to an area, the camera parameter calculation unit identifies the area based on vehicle position information acquired from outside, acquires a reference characteristic amount of the road surface sign matching with the dimension and the shape, and calculates the camera parameters.

3. The on-vehicle camera calibration apparatus according to claim 1, wherein the camera parameter calibration unit determines whether or not a user's own vehicle is in a state being suitable for calibration of the on-vehicle camera, and wherein, when the user's own vehicle is not in the state suitable for calibration of the on-vehicle camera, the camera parameter calibration unit keeps the on-vehicle camera from photographing an image.

4. The on-vehicle camera calibration apparatus according to claim 1, wherein the camera parameter calibration unit further compares thresholds on the installation height and the installation angle memorized in a memory device in advance with the calculated camera parameters, and wherein when at least one of the calculated camera parameters is determined to exceed a corresponding one of the thresholds, the camera parameter calibration unit outputs at least one of maintenance information and a prompt.

5. A process of using an on-vehicle camera calibration apparatus according to claim 1, comprising:
calculating the camera parameters from the characteristic amount of the road surface sign photographed by the on-vehicle camera and recognized by the image processing, and outputting the camera parameters, the camera parameters including an installation height and installation angle of the on-vehicle camera in photographing; and
performing the optical axis calibration control of the on-vehicle camera by the calculated and output camera parameters.

* * * * *